United States Patent Office 3,128,438
Patented Apr. 7, 1964

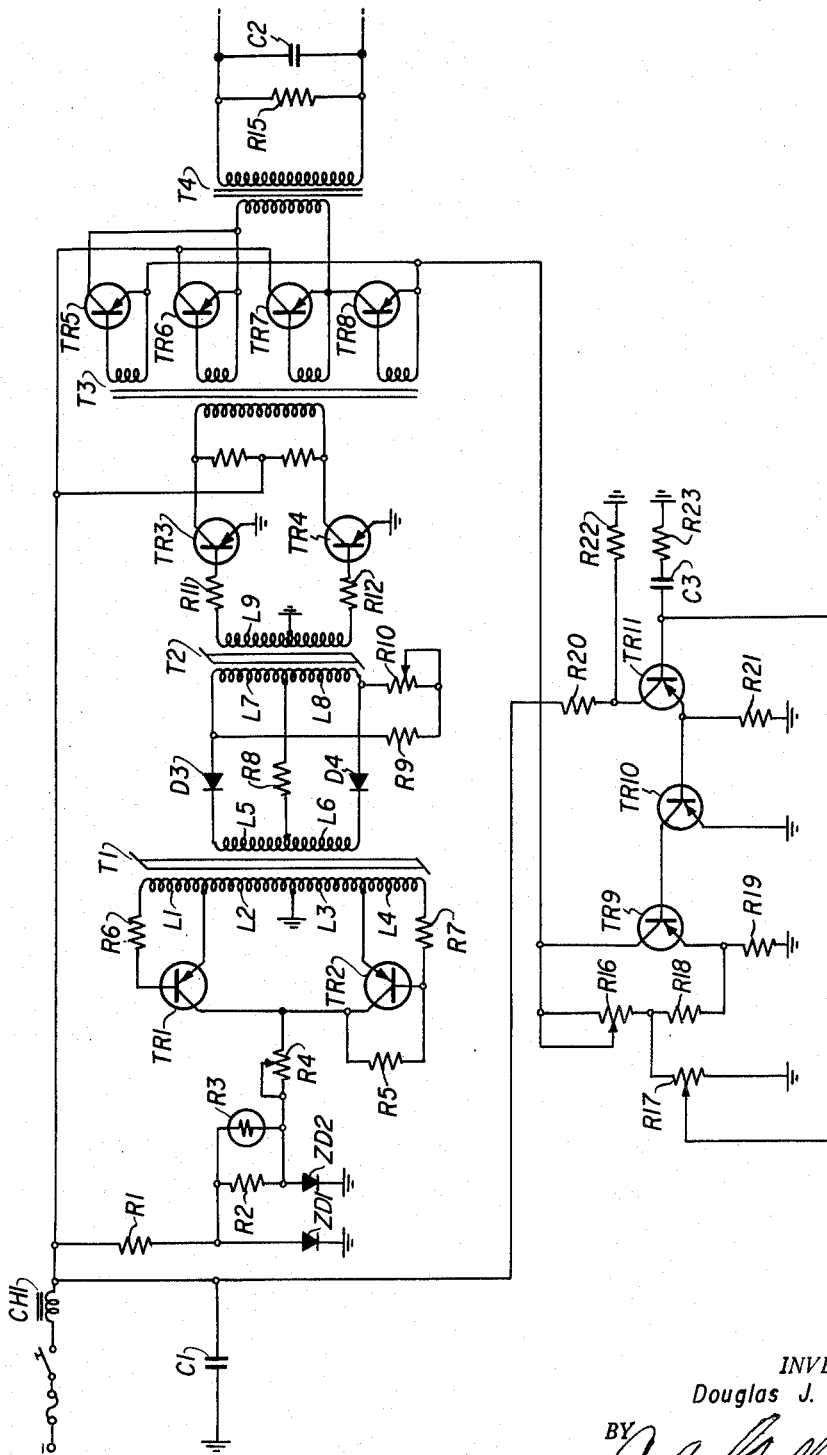

3,128,438
SQUARE WAVE GENERATOR WITH THIRD HARMONIC SUPPRESSOR
Douglas J. Suda, Downers Grove, Ill., assignor to Automatic Electric Laboratories, Inc., Northlake, Ill., a corporation of Delaware
Filed July 10, 1961, Ser. No. 123,047
3 Claims. (Cl. 331—75)

This invention relates to an inverter using transistors for obtaining an alternating current output from a direct current supply and is more particularly concerned with controlling the frequency and harmonic content in the output of such converters.

Transistor power inversion circuits provide a convenient means for obtaining alternating current from a direct current supply and are finding increasing use on account of their high efficiency. One well known inversion circuit, sometimes referred to as a ferroresonant transistor oscillator, utilizes a saturating transformer having a core with a rectangular hysteresis characteristic as the frequency determining element. The D.C. supply voltage is switched with alternating polarity across the primary winding of a saturable transformer by the transistors. This produces a substantially rectangular wave pattern whose half-cycle period is proportional to the time required for the transformer core to become magnetically saturated after each reversal of the conducting conditions of the transistors. The time required is inversely proportional to the magnitude of the voltage of the D.C. supply source. Consequently the frequency of the alternating voltage output is directly proportional to the D.C. voltage. For some applications, this is a disadvantageous characteristic. For instance in the application where this oscillator is utilized to supply the ringing current to ring subscribers on party lines having frequency selective ringing for selecting the called party telephone.

Accordingly the primary object of the invention is to provide an improved transistorized power inverter for producing an alternating current output from a direct current supply and which is characterized by its frequency stability and low harmonic content.

A feature of this invention is the use of a saturable core transformer to remove the objectionable harmonic of the primary frequencies.

Other objects and features of the present invention will become apparent from the following description thereof as developed in connection with the detailed description of the embodiment illustrating its principle. The features of the invention believed to be novel will be more particularly pointed out in the appended claims.

The drawing is a schematic circuit diagram of the transistor inverter circuit with a saturable core harmonic reduction circuit in accordance with the present invention.

This transistor converter circuit is for a D.-C. to A.-C. converter which furnishes low frequency power used to ring a subscriber telephone. It operates from a 48 volt exchange battery and is utilized to provide one of the five frequencies of the decimonic (20, 30, 40, 50 and 60 cycles), of the harmonic (16⅔, 25, 33⅓, 50 and 66⅔ cycles), or of the synchromonic (20, 30, 42, 54, and 66 cycles) series. Each frequency unit is capable of providing 25 watts of ringing power, and a sufficient amount of adjustable ring back tone.

*Circuit Description*

For simplification, the circuit has been divided into its functional parts.

*Input Filter*

The input filter consists of a choke CH1 and capacitor C1 which are provided to prevent high frequency harmonics, produced by the ringing converter, from being superimposed onto the supply battery. If these harmonics were not suppressed, they would interfere with telephone transmission.

*Input Voltage Regulator*

The input voltage regulator provides constant D.-C. voltage to the oscillator at all times. Due to the frequency characteristics of the oscillator, it is important that constant input voltage be applied. Zener diode ZD1 has a higher zener voltage then Zener diode ZD2. With variations in battery voltage, the potential at the point intermediate resistor R1 and diode ZD1 will vary slightly. This slight variation is applied to diode ZD2 which results in the potential at the point intermediate resistor R2 and diode ZD2 being very stable regardless of large changes in battery voltage. Thermistor R3 is connected across R2 to compensate for the temperature coefficient of ZD2. The net result is a regulator capable of providing constant D.-C. voltage for large variations in supply voltage and ambient temperatures.

*Oscillator*

The oscillator circuit basically consists of a toroidal coil with a square hysteresis loop core and two transistors.

The transistors operate on an "On-Off" basis to obtain a square wave A.-C. output voltage from a D.-C. source. The transistors are switched "On" and "Off" by control windings L1 and L4. When one transistor is "On" (conducting) the other is biased "Off."

Assume that TR1 is switched "On." This allows current to flow through L2 causing a voltage to be induced in each winding. TR1 remains "On" and TR2 remains "Off" while current continues to flow in L2. Flux increases in the core until it abruptly saturates. When this occurs, the induced control voltages fall to zero and both TR1 and TR2 are turned "Off." With no current to produce flux, the magnetic field starts to collapse; changing the direction of the induced voltages. Reversal of the voltages in control windings L1 and L4 causes TR1 to be biased "Off" and TR2 to turn "On." Now current flows through L3 and transistor TR2; causing voltages of opposite polarities to be induced in all windings. This current continues to flow until the core saturates again, completing one cycle of operation.

*Harmonic Reduction Circuit*

When generating power in the form of a symmetrical square wave, the odd harmonics are naturally present. To use this generator as a ringing current source for the standard frequency selective bridged ringing, it is necessary to reduce the third harmonic of some frequency units to prevent cross ring. For example: the third harmonic of 16⅔ cycles is 50 cycles. In the harmonic series of frequencies, both the 16⅔ and 50 cycle ringers are frequently bridged across the same line. If the third harmonic of the 16⅔ cycle unit were not reduced, then both 16⅔ and 50 cycle ringers would ring when the 16⅔ cycle frequency was applied. Therefore, it is necessary that the third harmonic of the 16⅔ and 20 cycle units be reduced to prevent cross ring.

The circuit used to remove the third harmonic consists of a toroidal coil with a square hysteresis loop core. Transformer T2 has a square hysteresis loop core that is designed to saturate in approximately two-thirds the time of one-half cycle.

Assume an input polarity such that current will flow through L7 and induce a voltage into L9 until T2 saturates. With T2 saturated, current continues to flow but voltage of the last third of the half cycle will not be induced into L9. When input polarity changes, current will flow through L8 inducing a voltage of opposite polarity into L9. Again T2 saturates preventing the last third of the half cycle from being induced into L9. By removing one-third of each half cycle the third harmonic has been eliminated.

Diodes D3 and D4 are used to prevent the collapsing field of T2 from inducing a large amount of voltage into L9 when current ceases to flow through windings L7 or L8. Potentiometer R10 is used to adjust the amount of current flowing through T2, thus adjusting the amount of waveform removed from each half cycle.

Drive Circuit

The driver stage is used to isolate the oscillator from the output to prevent load changes from affecting oscillator frequency stability and output voltage.

A driver which has resistance (R13 and R14) bridged across the output is used to prevent induced voltages from distorting the waveform. This distortion would cause the third harmonic to reappear.

Output Circuit

The output circuit is a bridge type amplifier in which two transistors operate in series at a given time. This prevents full battery voltage plus any induced voltage, across the output transformer primary, from "punching through" the non-conducting transistors.

Assuming an input polarity from the driver such that transistors TR5 and TR7 are biased "On" while TR6 and TR8 are biased "Off." Current flows from ground through the output transformer primary as shown. When incoming polarity from the driver reverses, TR5 and TR7 turn "Off" and TR6 and TR8 turn "On." This causes current to flow from ground through the output transformer in the opposite direction. Thus, A.-C. power is induced through the transformer as the cycles are repeated.

Resistor R15 and capacitor C2 serve as a filter to reduce the higher frequency harmonics inherently present in a square wave. These harmonics, if not filtered, would cause cross talk between cable pairs when ringing out onto a line. Also, these harmonics are used to provide ring back tone and when not filtered, exist in an excessive amount. R15 is the resistor used that determines the ring back tone level.

Load Limiter Circuit

To protect the ringing converter from damage when ringing into an overload or short circuit, a self-protecting feature is incorporated in each frequency unit. This feature enables each frequency unit to be overloaded for an indefinite length of time without damage.

The circuit diagram of the limiting circuit provides that under normal conditions all the D.-C. current required by the output circuit is supplied through the small resistor R19 and transistor TR9. Increasing load will cause the current through R19 to increase proportionally. A portion of the voltage drop across R19, selected at R17 (TR9 is fully conducting and R18 is zero), is applied to the base of TR11. When this negative voltage reaches a predetermined value, TR11 starts to conduct causing current to flow through R21. As load increases, the IR drop across R21 increases causing TR10 to conduct which starts to turn TR9 "Off." Now load current flows through R19, R18, and R16 and R18 being slightly greater than R19, increases the negative potential on the base of TR11. This increased potential causes TR9 to further cutoff until all the load current flows through R19, R16, and R18 and TR9 is fully turned "Off." The IR drop across resistors R19, R16, and R18 subtracted from the battery voltage equals the voltage applied to the output circuit. When the output is a short circuit, nearly all the battery voltage appears across R16. During overload the base of TR9 is more positive than its emitter which keeps TR9 fully cutoff preventing damage from occurring to the output circuit.

Reducing the load causes the negative potential on the base of TR11 to become less negative. When this potential falls below approximately −.5 volt, TR11 starts to turn "Off" causing TR10 to begin to turn "Off." TR9 starts to conduct and taking load current, causes TR11 to further turn "Off." This process continues until the output voltage restores and TR9 is fully conducting.

By adjusting the negative potential applied to the base of TR11, with slide wire resistor R17, the frequency unit can be set to cutoff at a predetermined load value. This cutoff feature eliminates the need for output fuses or ballast lamps and provides improved operation.

While there has been disclosed what's at present considered to be the preferred embodiment of the invention, other modifications will readily occur to those skilled in the art. It is not, therefore, desired that the invention be limited to the specific arrangement shown and described, and it is intended to cover in the appended claims all such modifications as fall within the true spirit and scope of the invention.

What is claimed is:

1. The combination, of a square wave generator of alternating current including transistors and a transformer having an output winding with a center tap, with a third harmonic suppressor including a second transformer having a center tapped primary winding and a center tapped secondary winding and having a saturable magnetic core, a diode connected between each end of the output winding of the generator and one end of the said primary winding, the center tap of said output winding connected through a resistance to the center tap of said primary winding, said connections of the output winding of the generator with the primary winding of the second transformer causing the output of the generator to be applied between the center tap and one end of the primary winding of the second transformer during one half cycle of the alternating current, and between the center tap and the other end of said primary winding during the other half cycle of the alternating current, adjustable means comprising a potentiometer connected across the said primary winding to adjust the current through said primary winding to such a value that said core becomes saturated in one third less time than the time of each one half cycle of the current received from said generator, the saturation of said core preventing the generation of the third harmonic of said alternating current in the secondary winding of said second transformer, and a driver circuit and an output amplifier connecting said secondary winding to the usual load.

2. The combination as claimed in claim 1, including a load limiter circuit connected to the output amplifier comprising a first transistor with its emitter and collector connected in series with a resistance through which normal output current flows, a second transistor, and resistances connected from said first resistance to the base of said second transistor to render the same conductive upon an increase of current in said output circuit, and a circuit connecting the emitter collector circuit of said second transistor to the base of said first transistor in such a manner as to render the first transistor nonconductive when the load current increases, and a series of resistances through which load current must be fed when said first transistor is nonconductive, for cutting down the flow of current to the load.

3. The combination of a square wave generator such as claimed in claim 1 having an input voltage regulator connected between the input voltage source and the electrodes of the transistors in the input of said generator, said regulator comprising a pair of zener diodes, a pair of resistances and a thermistor, one of said diodes and one resistor serially connected across the input voltage source, the second resistor and the thermistor connected in parallel and in series with said second diode between the junction of the first resistor and diode and one terminal of the source, and a connection between the junction of the second resistor and diode and the input electrodes of the transistors of the generator to thereby provide a two step voltage regulation of the input voltage to the generator and thus insure a constant frequency of oscillation thereof.

References Cited in the file of this patent

UNITED STATES PATENTS

| | | |
|---|---|---|
| 2,798,970 | Hall et al. | July 9, 1957 |
| 2,948,841 | Locanthi et al. | Aug. 9, 1960 |
| 2,962,602 | Decker et al. | Nov. 29, 1960 |
| 3,041,551 | Dornhoefer | June 26, 1962 |